No. 738,817. PATENTED SEPT. 15, 1903.
A. KING.
CHANGE SPEED DRIVING MECHANISM.
APPLICATION FILED FEB. 6, 1903.
NO MODEL. 2 SHEETS—SHEET 1.

Witnesses:
Inventor:
Andrew King

No. 738,817. PATENTED SEPT. 15, 1903.
A. KING.
CHANGE SPEED DRIVING MECHANISM.
APPLICATION FILED FEB. 6, 1903.
NO MODEL. 2 SHEETS—SHEET 2.

No. 738,817.

Patented September 15, 1903.

UNITED STATES PATENT OFFICE.

ANDREW KING, OF NOTTINGHAM, ENGLAND.

CHANGE-SPEED DRIVING MECHANISM.

SPECIFICATION forming part of Letters Patent No. 738,817, dated September 15, 1903.

Application filed February 6, 1903. Serial No. 142,166. (No model.)

*To all whom it may concern:*

Be it known that I, ANDREW KING, a subject of the King of Great Britain, and a resident of the city of Nottingham, England, have invented new and useful Improvements in Change-Speed Driving Mechanisms, of which the following is a specification.

This invention relates to improvements in change-speed driving mechanisms particularly applicable to motor-driven road-vehicles, and has for its object the construction of a mechanism which comprises a number of concentric friction-clutches which can be thrown in and out of action in succession by the movement in one direction of an operating-lever or its equivalent.

Figure 1:
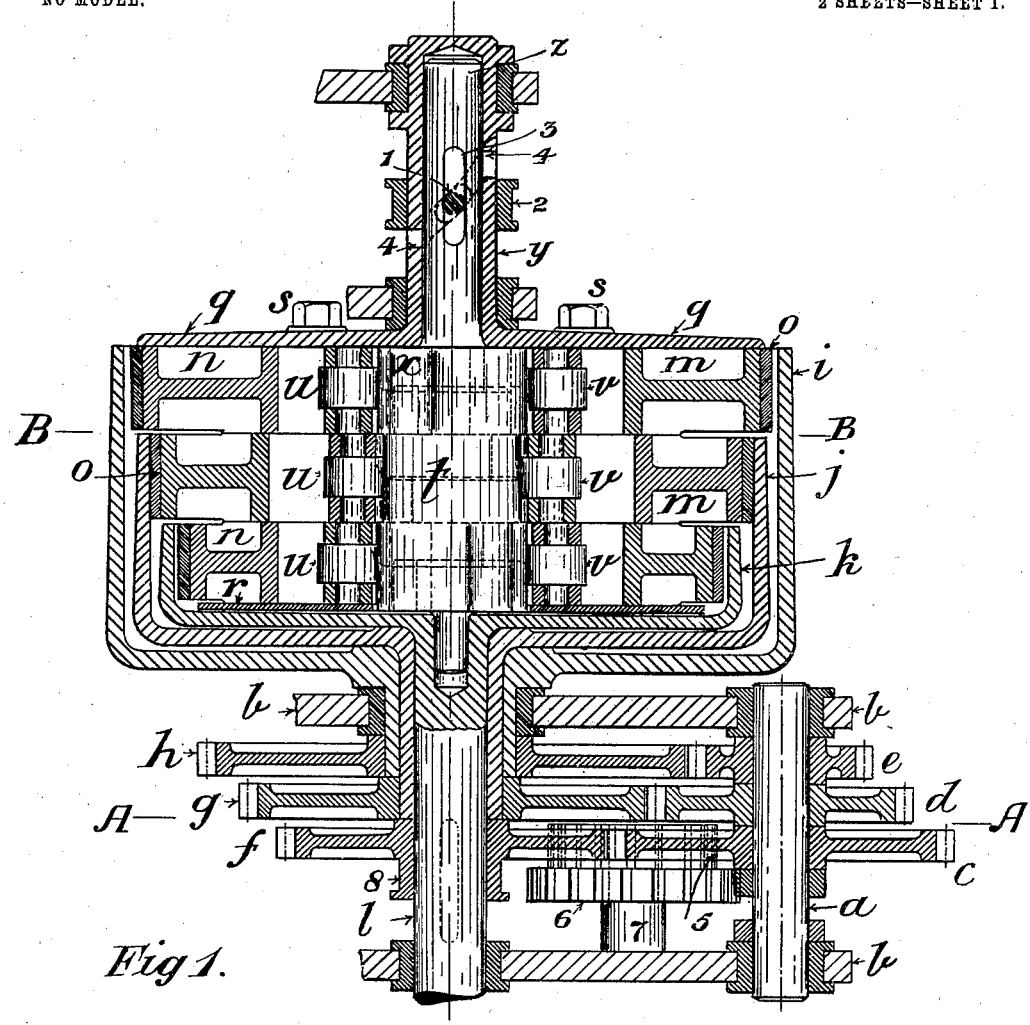
Figure 2:
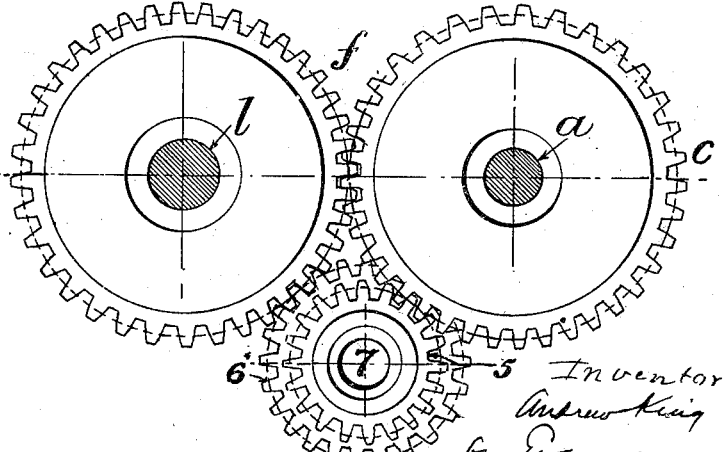
Figure 3:
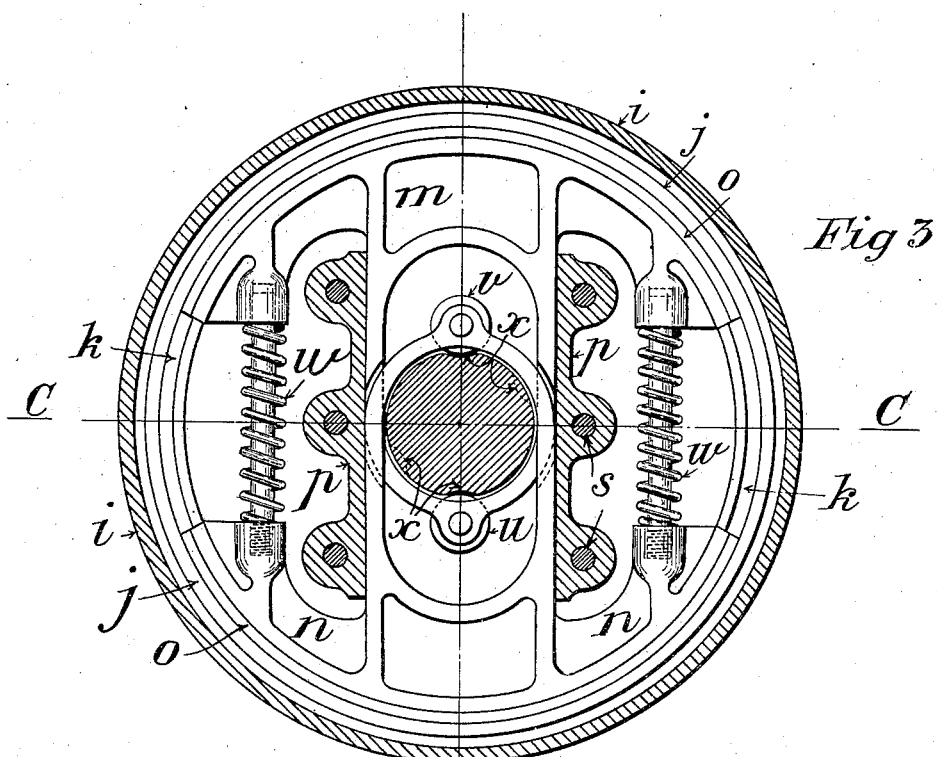
Figure 4:
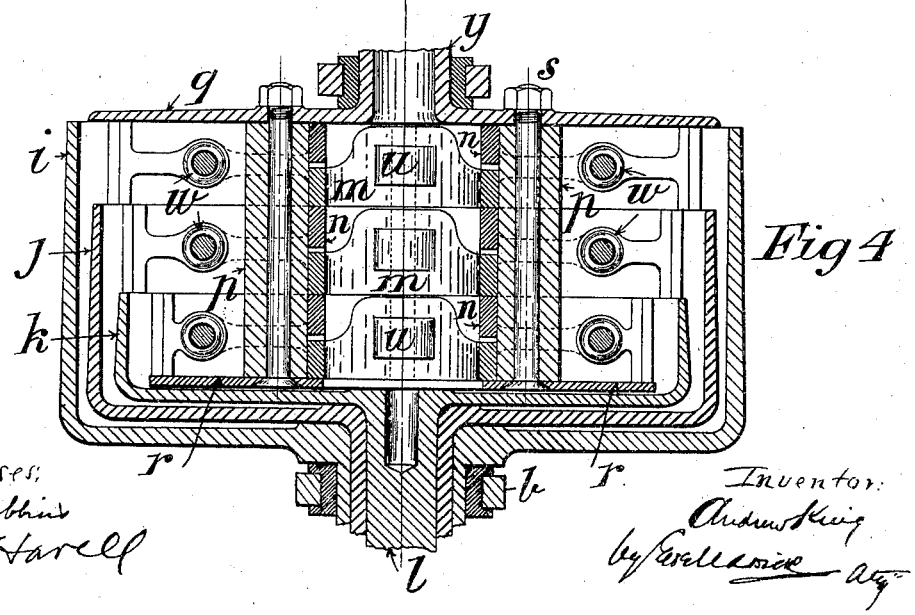

In the drawings which illustrate one method of carrying out this invention, Figure 1 is a sectional plan of the improved change-speed mechanism as filled with three clutches and a reversing mechanism. Fig. 2 is a section on the line A A, Fig. 1. Fig. 3 is a section on the line B B, Fig. 1; and Fig. 4 is a section on the line C C, Fig. 3, with the center shaft removed.

The drawings illustrate an arrangement of mechanism as designed for application to a motor-car, the motor of which is connected to a shaft $a$, fitted to run in bearings carried by brackets $b$ from any suitable part of the framing. The shaft $a$ is fitted with three toothed gear-wheels $c\ d\ e$ of different sizes, which gear with the toothed gear-wheels $f\ g\ h$. The wheel $h$ is fixed upon the hollow spindle of the outer clutch-sleeve $i$. The wheel $g$ upon the hollow spindle of the center clutch-sleeve $j$ and the wheel $f$ is fitted to drive the inner clutch-sleeve $k$ through the shaft $l$, upon which it can slide for throwing the reversing-gear in and out of operation. The inner portions of each clutch comprises two segmental pieces $m$ and $n$, which are provided with leather or other similar facings $o$ and are fitted to slide in a frame, which consists of side pieces $p$, which are firmly secured to end plates $q$ and $r$ by the bolts $s$. The segments $m$, which are above the cam-shaft $t$, have arms which project below the shaft and carry cam-rollers $u$, while the segments $n$, below the cam-shaft $t$, have arms which project above the shaft and carry the rollers $v$, and these rollers are held in contact with the cam-shaft, or the inner portions of the clutches are held in contact with their respective clutch-sleeve by the compression-springs $w$, by which arrangement the clutches are positively held out of action, and the centrifugal force of the rotating segments $m$ and $n$ assists in maintaining a driving contact between the two parts of the clutch. The shaft $t$, which has an end bearing in the shaft $l$, is made with three pairs of recesses $x$, which are equally spaced on the shaft, each pair of recesses controlling the action of one pair of segments $m$ and $n$, so that the clutches can be thrown into action successively by turning the shaft in either direction, and when one clutch is in action the other two clutches are held out of action. The three pairs of segments can thus slide independently of each other in the frame built up of the pieces $p$ and end plates $q$ and $r$. Consequently the three pairs of segments, the frame in which they can slide, and the hollow shaft $y$ rotate as a single piece and at a speed which depends upon the particular pair of segments in gear with their driving clutch-sleeve. In the drawings the center clutch is shown in contact with its driving-sleeve $j$, which is driven by the gear-wheels $d$ and $g$. The clutches are thrown in and out of action by turning the shaft $t$ independently of the rotation of the clutch. For this purpose the shaft $t$ has a reduced portion $z$, which can turn in the hollow spindle $y$, and through both shafts there is passed a pin 1, which is connected to a sliding collar 2, and this latter is embraced by a lever by which it is moved on the shaft $y$. The shaft $z$ has a straight slot 3, and the shaft $y$ has a helically or cam curved slot 4. The pin 1 is passed through both slots and when moved with the collar changes the relative position of the two shafts, and thus throws the clutches in and out of action.

The arrangement for reversing the direction of motion is shown in Figs. 1 and 2. The gear-wheel $c$ is geared to an intermediate pinion 5, which is attached to a larger pinion 6 and rotates upon a fixed axle 7. The wheel $f$ is fitted to slide upon its shaft $l$ and through the wheel-boss 8 and suitable levers can be moved clear of the wheel $c$ into engagement with the wheel 6 and is then driven by the wheel c through the intermediate pinions 5 and 6.

The shaft a or the shaft l may be coupled to the motor, and the end of the hollow shaft y is coupled by the ordinary connections with or without universal couplings to the differential gear and may be fitted with a brake-drum.

What I claim as my invention, and desire to secure by Letters Patent, is—

1. The combination of concentric clutch-sleeves, gear-wheels positively driving the said sleeves, sliding clutch-segments to each sleeve, springs for forcing the segments into contact with the sleeves, a shaft with cam-recesses and means carried by the segments, coöperating with said shaft to cause retractive movement of said segments as hereinafter set forth.

2. The combination of concentric clutch-sleeves, concentric bearings for the said sleeves, gear-wheels driving the sleeves at different speeds, sliding clutch-segments to each sleeve, a frame in which the segments are fitted to slide, compression-springs between each pair of segments, a shaft with recesses for each pair of segments, means for turning the shaft independently of other parts of the clutch and means carried by the segments, coöperating with the shaft to cause retractive movement of said segments, substantially as described.

3. The combination of concentric clutch-sleeves, concentric bearings for the sleeves, gear-wheels driving the sleeves at different speeds, sliding clutch-segments to each sleeve, a frame in which the segments are fitted to slide, compression-springs between each pair of segments, a shaft with recesses for each pair of segments arranged to operate the clutches in succession, a straight slot in a prolongation of the shaft with recesses, a curved slot in a shaft surrounding the last-mentioned shaft, a key passing through both slots, and a collar to which the said key is attached as herein set forth.

4. The combination of concentric clutch-sleeves, gear-wheels positively driving the said sleeves, sliding segments to each sleeve, end plates and connecting-pieces forming a frame for the segments to slide in, compression-springs between the segments of each pair, friction-rollers carried by the segments, a center shaft which rotates with the clutch and can be turned separately and means for turning the shaft as herein set forth.

5. The combination of concentric clutch-sleeves, sliding segments to each sleeve, a frame in which the segments can slide, springs between the segments, a center shaft, recesses in such shaft, means carried by the segments, coöperating with said shaft to cause retractive movement of said segments, means for turning the shaft independently of the clutch, gear-wheels driving the concentric clutch-sleeves, and gear-wheels for changing the direction of motion as herein set forth.

In testimony whereof I have signed my name in the presence of two subscribing witnesses.

ANDREW KING.

Witnesses:
NATHANIEL WALTER REED,
JOHN ARCHER.